US 11,338,446 B2
United States Patent
Matsuo et al.

(10) Patent No.: US 11,338,446 B2
(45) Date of Patent: *May 24, 2022

(54) MACHINING ROBOT AND MACHINING METHOD

(71) Applicant: SUBARU CORPORATION, Tokyo (JP)

(72) Inventors: Shinya Matsuo, Tokyo (JP); Tatsuo Nakahata, Tokyo (JP); Yuichi Ishikawa, Tokyo (JP); Atsushi Rihei, Tokyo (JP); Yasuto Nishiwaki, Tokyo (JP); Masao Watanabe, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 246 days.

This patent is subject to a terminal disclaimer.

(21) Appl. No.: 16/471,633

(22) PCT Filed: Oct. 31, 2017

(86) PCT No.: PCT/JP2017/039460
§ 371 (c)(1),
(2) Date: Jun. 20, 2019

(87) PCT Pub. No.: WO2018/123251
PCT Pub. Date: Jul. 5, 2018

(65) Prior Publication Data
US 2020/0122336 A1 Apr. 23, 2020

(30) Foreign Application Priority Data
Dec. 28, 2016 (JP) .............................. JP2016-256318

(51) Int. Cl.
B25J 13/08 (2006.01)
B25J 9/10 (2006.01)
(Continued)

(52) U.S. Cl.
CPC ............. *B25J 13/085* (2013.01); *B25J 9/101* (2013.01); *B25J 9/1633* (2013.01); *B25J 9/1679* (2013.01);
(Continued)

(58) Field of Classification Search
CPC ........ B25J 13/085; B25J 11/005; B25J 9/101; B25J 9/1633; B25J 9/1679; B25J 11/0055;
(Continued)

(56) References Cited

U.S. PATENT DOCUMENTS 3,739,679 A 6/1973 Schwend
4,909,108 A 3/1990 Nakada et al.
(Continued)

FOREIGN PATENT DOCUMENTS

CA 3066343 12/2018
CN 2404648 Y 11/2000
(Continued)

OTHER PUBLICATIONS

Supplemental Partial European Search Report Received in EP Application No. 17887317 dated Dec. 4, 2020 (29 Pages).
(Continued)

Primary Examiner — Ian Jen
(74) Attorney, Agent, or Firm — mith, Gambrell & Russell, LLP

(57) ABSTRACT

A robot control system according to an embodiment is a control system for a robot comprising an arm, the arm being capable of holding a tool while rotating the tool and capable of moving the tool in at least two-dimensional directions, the arm being equipped with a rotating mechanism provided for the tool. The robot control system comprises a load-acquiring unit and a control-signal-generating unit. The load-acquiring unit is configured to acquire a force measured by (Continued)

a force sensor configured to measure a force applied from the tool to the arm during profile copying performed on a machining object by moving the arm while a copying guide attached to the arm and a copying mold placed on the machining object are kept in contact with each other. The control-signal-generating unit is configured to automatically control the arm by generating a control signal for the arm in accordance with the force acquired by the load-acquiring unit and with control information for the arm regarding the profile copying, and by outputting the control signal to the arm.

19 Claims, 6 Drawing Sheets

(51) Int. Cl.
    *B25J 9/16*           (2006.01)
    *B25J 11/00*         (2006.01)
    *G05B 19/401*       (2006.01)
    *B27C 5/00*          (2006.01)

(52) U.S. Cl.
    CPC .......... *B25J 11/005* (2013.01); *B25J 11/0055* (2013.01); *B27C 5/003* (2013.01); *G05B 19/401* (2013.01); *G05B 2219/39325* (2013.01); *G05B 2219/45068* (2013.01); *G05B 2219/45247* (2013.01)

(58) Field of Classification Search
    CPC ...... B25J 11/006; B27C 5/003; G05B 19/401; G05B 2219/45068; G05B 2219/39325; G05B 2219/45247; G05B 2219/45059; G05B 2219/49086; G05B 2219/49099; G05B 2219/39323; G05B 2219/39322; B27D 5/006; B23C 3/12
    See application file for complete search history.

(56) References Cited

U.S. PATENT DOCUMENTS

| | | | | |
|---|---|---|---|---|
| 5,165,829 | A | * | 11/1992 | Ross ..................... B23Q 1/0063 409/125 |
| 5,333,974 | A | * | 8/1994 | Matsuura ............. B23Q 35/123 318/578 |
| 5,394,513 | A | | 2/1995 | Sgarbi et al. |
| 8,806,999 | B2 | | 8/2014 | Tanaka |
| 9,339,906 | B2 | | 5/2016 | Kobayashi |
| 9,539,686 | B2 | | 1/2017 | Tanaka |
| 9,724,801 | B2 | | 8/2017 | Gu |
| 2010/0106285 | A1 | | 4/2010 | Massey |
| 2010/0185315 | A1 | | 7/2010 | Schmidt et al. |
| 2011/0170973 | A1 | * | 7/2011 | Von Puttkamer ....... B23P 15/32 408/230 |
| 2012/0220194 | A1 | | 8/2012 | Maloney et al. |
| 2013/0312991 | A1 | | 11/2013 | Hideta et al. |
| 2016/0303697 | A1 | * | 10/2016 | Isobe ................. B23Q 3/15722 |
| 2016/0318151 | A1 | * | 11/2016 | Kitahata ................ B24B 41/06 |
| 2016/0332273 | A1 | * | 11/2016 | Furuya ............... B23Q 17/0971 |
| 2017/0008102 | A1 | | 1/2017 | Ishikawa et al. |
| 2018/0126507 | A1 | | 5/2018 | Rivers et al. |
| 2020/0086406 | A1 | | 3/2020 | Ishikawa et al. |
| 2020/0108481 | A1 | | 4/2020 | Matsuo et al. |
| 2021/0291369 | A1 | * | 9/2021 | Hashimoto .............. G09B 5/02 |
| 2021/0299867 | A1 | * | 9/2021 | Kenneally ............. B25J 9/1664 |

FOREIGN PATENT DOCUMENTS

| | | |
|---|---|---|
| CN | 1415458 A | 5/2003 |
| CN | 101801617 A | 8/2010 |
| CN | 104249195 A | 12/2014 |
| CN | 104364049 A | 2/2015 |
| CN | 105269690 A | 1/2016 |
| EP | 0292971 A2 | 11/1988 |
| EP | 2946864 A1 | 11/2015 |
| EP | 3563988 A1 | 11/2019 |
| FR | 2682905 B1 | 4/1993 |
| GB | 1 231 289 | 5/1971 |
| JP | S49-013677 | 4/1974 |
| JP | S54-160707 A | 12/1979 |
| JP | S59-140121 U | 9/1984 |
| JP | S60-025673 A | 2/1985 |
| JP | H03-047719 | 5/1991 |
| JP | 1993-12058 U | 2/1993 |
| JP | H05-020816 U | 3/1993 |
| JP | H05-134737 A | 6/1993 |
| JP | H07-132471 A | 5/1995 |
| JP | H09-155738 A | 6/1997 |
| JP | H10-11125 A | 1/1998 |
| JP | 2000-343401 A | 12/2000 |
| JP | 2002-018629 A | 1/2002 |
| JP | 2002-239824 A | 8/2002 |
| JP | 2002-370116 A | 12/2002 |
| JP | 2006-142434 A | 6/2006 |
| JP | 2006-320991 A | 11/2006 |
| JP | 2010-253613 A | 11/2010 |
| JP | 2011-216050 A | 10/2011 |
| JP | 2012-139789 A | 7/2012 |
| JP | 2013-043232 A | 3/2013 |
| JP | 2013-244556 A | 12/2013 |
| JP | 2013-244564 A | 12/2013 |
| JP | 2014-40001 A | 3/2014 |
| JP | 2017-019042 A | 1/2017 |
| WO | 2016/183390 A1 | 11/2016 |
| WO | 2018/123251 | 7/2018 |
| WO | 2018/235429 | 12/2018 |

OTHER PUBLICATIONS

Pan, Z., et al. Robotic machining from programming to process control: a complete solution by force control. Industrial Robot. 2008. Vol. 35, No. 5, pp. 400-409.

Song, H-C., et al. Precision robotic deburring based on force control for arbitrarily shaped workpiece using CAD model matching. International Journal of Precision Engineering and Manufacturing. 2012. vol. 14, No. 1, pp. 85-91.

Alici, G., et al. Robotic drilling under force control: Execution of a task. Proceedings of the IEEE/RSJ/GI International Conference on Intelligent Robots and Systems: Advanced Robotics and the Real World. 1994. vol. 3, pp. 1618-1625.

Slamani, M., et al. Comparison of surface roughness quality obtained by high speed CNC trimming and high speed robotic trimming for CFRP laminate. Robotics and Computer-Integrated Manufacturing, Elsevier Science Publishers BV 2016. Vol 42, pp. 63-72.

Office Action received in U.S. Appl. No. 16/690,245 dated Jan. 6, 2021 (14 Pages).

International Search Report for PCT/JP2017/039460, dated Dec. 26, 2017 (4pgs. with English translation).

Written Opinion of the International Searching Authority for PCT/JP2017/039460, dated Dec. 26, 2017 (4pgs.).

First Japanese Office Action dated Feb. 20, 2020 in JP Patent Application No. 2018-558856 (8 pages inclusive of its English machine translation).

Extended European search report dated Feb. 12, 2021 in EP Patent Application No. 18 820 149.5 (6 pages).

International Preliminary Report on Patentability for PCT/JP2017/039460 dated Dec. 26, 2017 (in Japanese with English Machine Translation, 12 pages).

English Translation of the Written Opinion for PCT/JP2017/039460 dated Dec. 26, 2017 (6 pages).

Japanese Office Action dated Aug. 24, 2021 for Japanese Patent Application No. 2019-525184 (6 pages in Japanese with English Translation),.

(56) References Cited

OTHER PUBLICATIONS

Final Office Action received in U.S. Appl. No. 16/690,245 dated Jul. 13, 2021 (16 pages).

* cited by examiner

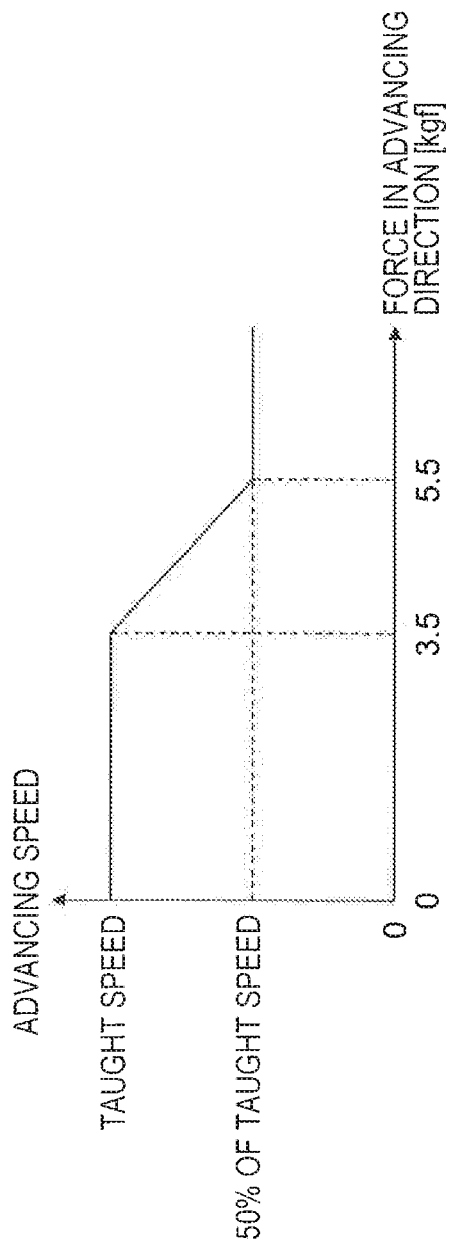

MACHINING ROBOT AND MACHINING METHOD

TECHNICAL FIELD

Embodiments of the present invention relate to a machining robot, a machining method, a robot control system, a robot control method, and a robot control program.

BACKGROUND ART

Hitherto known methods of performing profile trimming on a machining object (a work) made of a composite material or metal include copying in which a copying mold as a jig is placed on the work while a cutting tool called end mill or router bit and a guide to be brought into contact with the copying mold are attached to a machine tool such as a milling machine or a router machine.

Other methods have also been proposed in which a process such as chamfering, deburring, polishing, or grinding is performed with a tool held by an arm of a robot (see PTL 1 to 5, for example). In some particular proposals, a force sensor is provided on an arm of an articulated robot so that a reaction force from a work is detected, and a process such as chamfering, deburring, polishing, or grinding is performed while a specific force is applied to the work.

CITATION LIST

Patent Literature

PTL 1: Japanese Unexamined Patent Application Publication No. 2002-370116
PTL 2: Japanese Unexamined Patent Application Publication No. 2012-139789
PTL 3: Japanese Unexamined Patent Application Publication No. 2014-40001
PTL 4: Japanese Unexamined Patent Application Publication No. 2011-216050
PTL 5: Japanese Unexamined Patent Application Publication No. 2010-253613

SUMMARY OF INVENTION

Technical Problem

The accuracy of positioning by a robot is incomparably lower than the accuracy of positioning by a machine tool, which is capable of positioning a tool at a pitch of 0.01 mm to 0.001 mm. This is because an arm of the robot has a lower rigidity than a main shaft of the machine tool such as a machining center or a milling machine.

Therefore, processes to be performed by the robot are limited to processes, such as chamfering, deburring, polishing, and grinding, in which machining accuracy is moderate or the reaction force from the work is relatively small. In a cutting process such as profile trimming or pocket machining to be performed on a work by using an end mill that is required to have a machining accuracy represented by a tolerance of about ±0.1 mM to ±1.0 mm, it is inevitable to rely on the machine tool, which is of a larger scale and more expensive than the robot.

In a case where a large-scale machine tool, such as a machining center or a milling machine, cannot be introduced for trimming the profile of the work, copying in which the worker manually uses a hand router equipped with a copying guide is performed. Specifically, a copying mold is attached to the work, and the worker manually cuts the work while pressing the copying guide of the hand router having a router bit against the copying mold.

In the manual work by the worker, the traveling speed of the router bit needs to be adjusted in accordance with machining conditions such as changes in the thickness of the work, the shape of the work, and the state of wear of the tool. Hence, in terms of assured machining quality, it is a problem that copying on a work cannot be performed unless the worker is skillful.

Accordingly, an object of the present invention is to realize highly accurate machine cutting to be performed on a work by using a robot, such as profile trimming, profile roughing, profile finishing, grooving, pocket machining, or drilling in which a reaction force from the work is large.

Solution to Problem

A robot control system according to an embodiment of the present invention is a control system for a robot comprising an arm, the arm being capable of holding a tool while rotating the tool and capable of moving the tool in at least two-dimensional directions, the arm being equipped with a rotating mechanism provided for the tool. The robot control system comprises a load-acquiring unit and a control-signal-generating unit. The load-acquiring unit is configured to acquire a force measured by a force sensor configured to measure at least a force applied from the tool to the arm during profile copying performed on a machining object by using the tool and by moving the arm while a copying guide attached to the arm and a copying mold placed on the machining object are kept in contact with each other. The control-signal-generating unit is configured to automatically control the arm such that the profile copying is performed, by generating a control signal for the arm regarding the profile copying in accordance with the force acquired by the load-acquiring unit and with control information for the arm regarding the profile copying, and by outputting the generated control signal to the arm.

A machining robot according to an embodiment of the present invention comprises the robot control system, the arm, and the force sensor.

A robot control method according to an embodiment of the present invention is a control method for a robot comprising an arm, the arm being capable of holding a tool while rotating the tool and capable of moving the tool in at least two-dimensional directions, the arm being equipped with a rotating mechanism provided for the tool. The robot control method comprises a step of acquiring a force measured by a force sensor configured to measure at least a force applied from the tool to the arm during profile copying performed on a machining object by using the tool and by moving the arm; and a step of automatically controlling the arm such that the profile copying is performed, by generating a control signal for the arm regarding the profile copying in accordance with the acquired force and with control information for the arm regarding the profile copying, and by outputting the generated control signal to the arm.

A robot control program according to an embodiment of the present invention is a control program for a robot comprising an arm, the arm being capable of holding a tool while rotating the tool and capable of moving the tool in at least two-dimensional directions, the arm being equipped with a rotating mechanism provided for the tool. The robot control program causes the robot control system to execute a step of acquiring a force measured by a force sensor configured to measure at least a force applied from the tool to the arm during profile copying performed on a machining object by using the tool and by moving the arm; and a step of automatically controlling the arm such that the profile copying is performed, by generating a control signal for the arm regarding the profile copying in accordance with the acquired force and with control information for the arm regarding the profile copying, and by outputting the generated control signal to the arm.

A machining method according to an embodiment of the present invention comprises a step of manufacturing a finished or half-finished product through profile copying performed on a machining object by using a tool, in which the tool, a rotating mechanism configured to rotate the tool, and a copying guide to be brought into contact with a copying mold to be placed on the machining object are attached to an arm comprised in a robot and being movable in at least two-dimensional directions, and the arm is moved while the copying guide and the copying mold are kept in contact with each other; a step of measuring, with a force sensor, at least a force applied from the tool to the arm during the profile copying; and a step of automatically adjusting a traveling speed of the arm in accordance with the force measured with the force sensor.

BRIEF DESCRIPTION OF DRAWINGS

FIG. 6 is a graph illustrating a method of controlling an arm of the machining robot illustrated in FIG. 1.

EMBODIMENTS

A machining robot, a machining method, a robot control system, a robot control method, and a robot control program according to embodiments of the present invention will now be described with reference to the accompanying drawings.

(Configurations and Functions of Machining Robot and Robot Control System)

Figure 1:
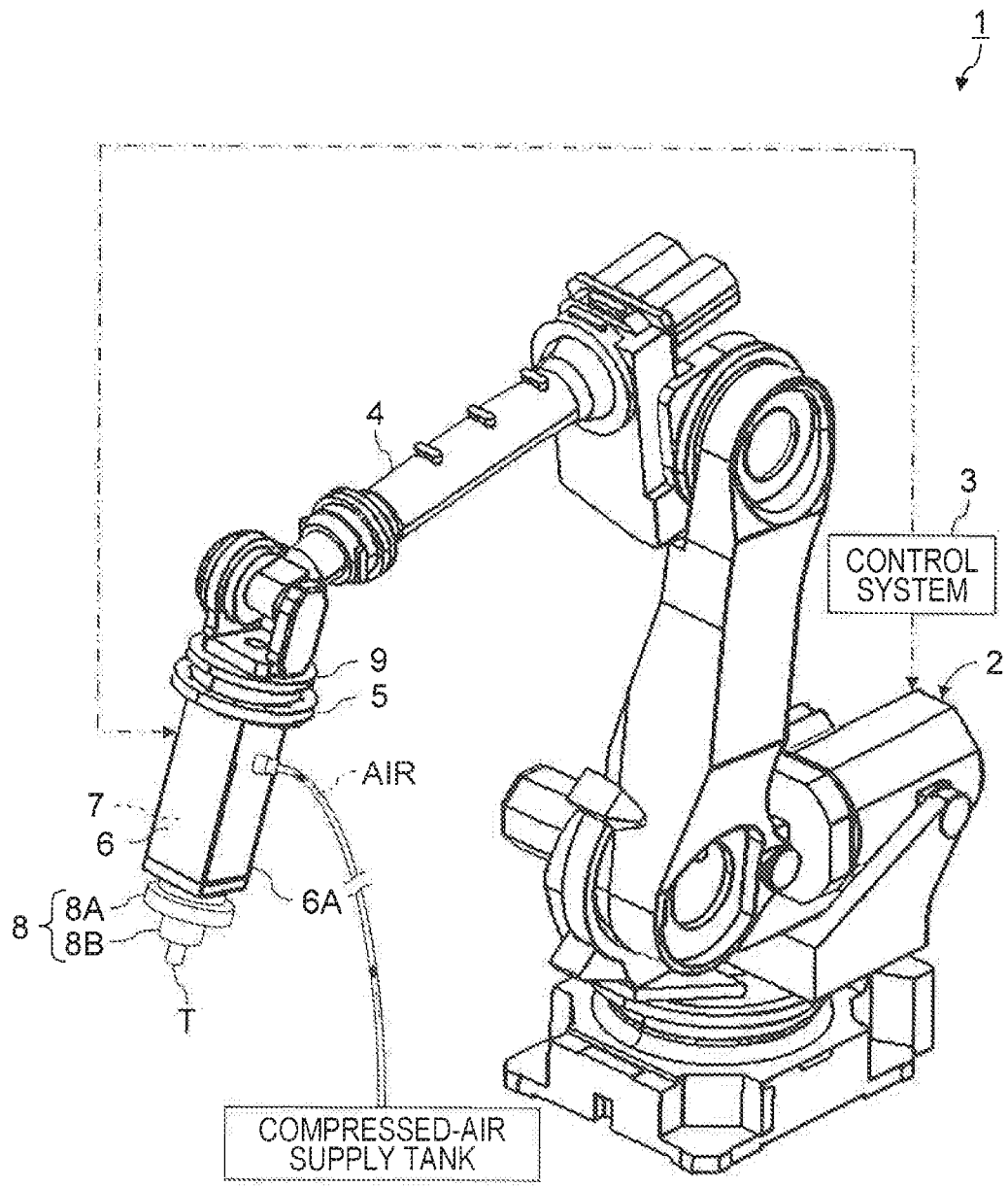
FIG. 1 is a diagram of a machining robot according to an embodiment of the present invention.
Figure 2:
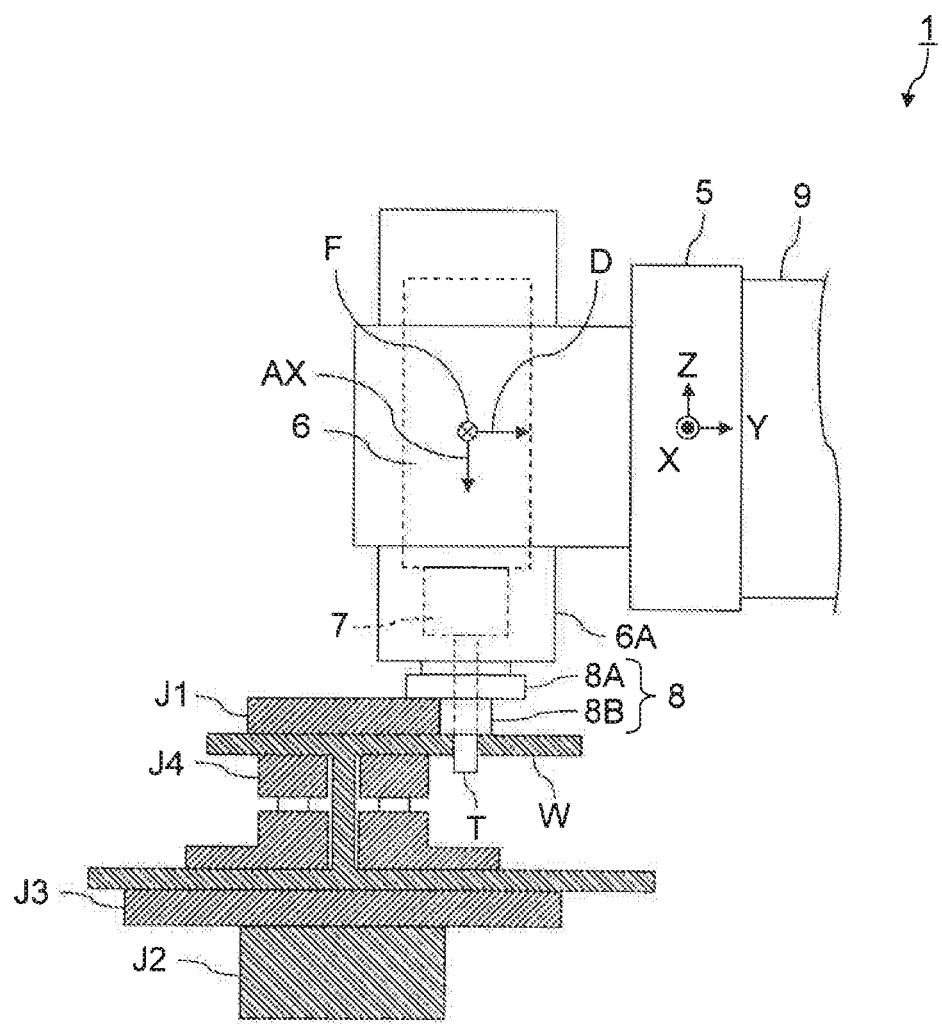
FIG. 2 illustrates a machining method in which profile copying is performed on a machining object with a tool attached to the machining robot illustrated in FIG. 1.

FIG. 1 is a diagram of a machining robot according to an embodiment of the present invention. FIG. 2 illustrates a machining method in which profile copying is performed on a machining object with a tool attached to the machining robot illustrated in FIG. 1.

A machining robot 1 includes a robot 2, and a control system 3 provided for the robot 2. The robot 2 includes a cantilever arm 4 including links coupled to one another with a plurality of joints. The arm 4 has an attaching jig 5 at the tip thereof. A forwarding mechanism 6, a rotating mechanism 7, a copying guide 8, and a tool T are attached to the attaching jig 5.

The arm 4 is capable of moving the forwarding mechanism 6, the rotating mechanism 7, the copying guide 8, and the tool T on the attaching jig 5 in at least two-dimensional directions. For example, three links that are coupled to one another in a plane with two joints whose axes of rotation are parallel to each other can form an arm 4 that is capable of moving the forwarding mechanism 6, the rotating mechanism 7, the copying guide 8, and the tool T on the attaching jig 5 in two-dimensional directions within the plane in which the three links are disposed.

Typically, as illustrated in FIG. 1, the robot 2 includes an arm 4 that is capable of moving the forwarding mechanism 6, the rotating mechanism 7, the copying guide 8, and the tool T on the attaching jig 5 in three-dimensional directions. In the example illustrated in FIG. 1, the arm 4 includes a plurality of links coupled to one another with a plurality of rotating mechanisms. Therefore, the forwarding mechanism 6, the rotating mechanism 7, the copying guide 8, and the tool T on the attaching jig 5 are not only movable translationally in three-dimensional directions but also tiltable in desired directions with rotational motions.

The forwarding mechanism 6 moves the tool T forward in the direction of a tool axis AX. The rotating mechanism 7 holds and rotates the tool T. Accordingly, the forwarding mechanism 6 indirectly causes the tool T to move forward in the direction of the tool axis AX by causing the rotating mechanism 7 that holds and rotate the tool T to move forward in the direction of the tool axis AX. The forwarding mechanism 6 and the rotating mechanism 7 may each be a general device employing any method such as a pneumatic method, a hydraulic method, or an electrical method. In the example illustrated in FIG. 1, the forwarding mechanism 6 and the rotating mechanism 7 each employ a pneumatic method. Therefore, the forwarding mechanism 6 having the rotating mechanism 7 thereinside is connected to a compressed-air supply tank. Of course, one of or each of the forwarding mechanism 6 and the rotating mechanism 7 may employ an electrical method. In that case, a motor included in the one of or each of the forwarding mechanism 6 and the rotating mechanism 7 is connected to a power source.

As described above, the robot 2 includes the arm 4 that is capable of holding the tool T while allowing the tool T to be rotated by the rotating mechanism 7 and also capable of causing the tool T indirectly held thereby with the aid of the rotating mechanism 7 to move in two-dimensional directions or three-dimensional directions. Hence, the robot 2 can machine a work (a machining object) W with the tool T by driving the arm 4 two-dimensionally or three-dimensionally.

The tool T to be held by the rotating mechanism 7 may be not only a chamfering cutter or a deburring tool but also any of various rotational machining tools such as an end mill, a drill, and a reamer. Therefore, the machining robot 1 equipped with the rotational tool T can perform desired cutting on the work W. Specifically, the machining robot 1 can perform, on a work W having a plate or block shape, various kinds of cutting such as profile trimming, profile roughing, profile finishing, grooving, pocket machining of forming a recess surrounded by a flange, roughing of the inner surface of the flange, finishing of the inner surface of the flange, drilling, chamfering, and deburring.

The work W as an object of cutting may be made of any of the following materials that are cuttable: composite materials such as glass-fiber-reinforced plastic (GFRP) and carbon-fiber-reinforced plastic (CFRP), metal, and so forth.

The copying guide 8 is a copying jig intended for the arm 4 and to be attached to the arm 4 so as to be brought into contact with a copying mold J1 to be placed on the work W. The copying guide 8 may be not only a guide for positioning the tool T in a tool radial direction D by coming into contact with the copying mold J1 in the tool radial direction D, but also a guide for positioning the tool T in the direction of the tool axis AX by coming into contact with the copying mold J1 in the direction of the tool axis AX.

In the example illustrated in FIGS. 1 and 2, a copying guide 8 including a cylindrical portion 8B coaxially disposed on one side of a disc-shaped member 8A having a through-hole for insertion of the tool T is fixed to a casing 6A of the forwarding mechanism 6 having the rotating mechanism 7 thereinside. The disc-shaped member 8A serves as a guide for positioning the tool T in the direction of the tool axis AX by coming into contact with the copying mold J1 in the direction of the tool axis AX. The cylindrical portion 8B serves as a guide for positioning the tool T in the tool radial direction D by coming into contact with the copying mold J1 in the tool radial direction D. The tool T is allowed to project from the through-hole, provided on the center axis of the copying guide 8, toward the work W.

The copying guide 8 may be rotatably attached to the arm 4 with a rotating mechanism such as a bearing interposed therebetween. Note that if the work W is made of CFRP, gaps in the bearing may be clogged with carbon particles.

Accordingly, if the copying guide 8 is fixed to the arm 4 with no rotating mechanism such as a bearing interposed therebetween, the entry of particles of the composite material into the rotating mechanism can be prevented with a simple configuration of the copying guide 8. Alternatively, the copying guide 8 may be rotatably attached to the arm 4 with the aid of a sealed bearing configured to block the entry of particles thereinside.

The shape of the copying guide 8 and the position of the copying guide 8 on the arm 4 may be determined flexibly in accordance with the shape and the position of the work W itself and the shape and the position of the copying mold J1 placed on the work W.

The copying mold J1 is a copying jig to be placed on the work W. Specifically, the copying mold J1 has a surface to be in contact with the copying guide 8 in the tool radial direction D, and a surface to be in contact with the copying guide 8 in the direction of the tool axis AX. Therefore, when the copying mold J1 is brought into contact with the copying guide 8 at the two contact surfaces thereof, the tool T can be positioned both in the tool radial direction D and in the direction of the tool axis AX. Then, the arm 4 is moved while the copying guide 8 on the arm 4 and the copying mold J1 on the work W are kept in contact with each other, whereby profile copying can be performed on the work W with the tool T.

In the example illustrated in FIG. 2, an I-shaped stringer (a longeron) as one of aircraft components is taken as the work W. The I-shaped stringer is a stringer having an I-shaped cross section. Specifically, the I-shaped stringer has two flanges on two respective sides of a web. FIG. 2 illustrates an exemplary case of manufacturing an I-shaped stringer by cutting flange portions of a material having an I-shaped cross section.

Accordingly, one of the flanges that is on the lower side of the work W is placed on a plate-shaped jig J3 fixed to a machining table J2. Furthermore, a plate-shaped copying mold J1 is placed on the other flange that is on the upper side of the work W. The copying mold J1 has an outline that is offset from the outline of the work W to be obtained after the machining, by the distance from the contact surface between the copying guide 8 and the copying mold J1 to the cutting plane of the tool T. That is, the copying mold J1 has an end face that is offset from the end face of the flange to be obtained after the machining, by a certain distance corresponding to the configuration of the copying guide 8.

Specifically, if profiling is to be performed with a tool T having a diameter of 10 mm, the diameter of the cylindrical portion 8B of the copying guide 8 is to be set to 14 mm to 15 mm. In such a case, the distance between the side face of the cylindrical portion 8B of the copying guide 8 and the cutting plane of the tool T is 2 mm to 2.5 mm. Therefore, the amount of offset between the end face of the copying mold J1 and the outline of the work W to be obtained after the machining is 2 mm to 2.5 mm.

When a force acts in the thickness direction of the flange, the tip of the flange may deform. Accordingly, as illustrated in FIG. 2, a jack J4 for reinforcement is desirably disposed between the lower flange and the upper flange.

Then, while the stepped cylindrical copying guide 8 attached to the arm 4 and the plated-shaped copying mold J1 placed on the work W are kept in contact with each other, the arm 4 is moved. Thus, a profile-trimming copying process of cutting the plate-shaped portion of the work W with the tool T such as an end mill or a router bit can be performed.

Specifically, if the arm 4 is moved while the curved surface of the cylindrical portion 8B of the copying guide 8 is kept in contact with the end face of the plate-shaped copying mold J1, copying on the work W can be performed with the tool T being positioned accurately in the tool radial direction D that is perpendicular to both an advancing direction F of the tool T and the tool axis AX. On the other hand, if the arm 4 is moved while the flat surface of the disc-shaped member 8A of the copying guide 8 is kept in contact with the upper surface of the plate-shaped copying mold J1, copying on the work W can be performed with the tool. T being positioned accurately in the direction of the tool axis AX. In other words, since the copying guide 8 has a stepped cylindrical shape, the copying mold J1 for profile copying can have a simple plate shape.

Of course, copying for obtaining any component having a desired configuration, not only the example illustrated in FIG. 2, is possible. For example, any of aircraft components including stringers with cross sections having various shapes such as an I shape, a T shape, and a hat shape; spars (beams); ribs (airfoil parts); panels (outer panels); and assemblies of any of the forgoing can be taken as the work W, i.e., the object to be machined by copying. Examples of performable profile copying include profile trimming of a panel, trimming of an end face of a flange, machining of an inner surface of a flange, machining of an outer surface of a flange, and the like. Moreover, profile copying with the machining robot 1 can be employed in manufacturing not only aircraft components but also any desired finished or half-finished products such as automobile components and railway vehicle components.

Therefore, the shape and the position of the copying mold J1 may also be determined flexibly in accordance with the shape and the position of the work W and the shape and the position of the copying guide 8 attached to the arm 4.

The arm 4 is provided with a force sensor 9 for detecting the force applied to the arm 4. The force sensor 9 is a sensor for detecting at least a force applied from the tool T to the arm 4. Specifically, in a case of profiling performed on the work W with a cutting edge formed on a side face of the tool T, a reaction force containing major components acting in the advancing direction F of the tool T and the tool radial direction D perpendicular to the advancing direction F of the tool T, respectively, is applied from the work W to the tool T. Furthermore, in a case of cutting, such as grooving, performed with an end cutting edge of the tool T as well or in a case of machining with a chamfering cutter or a counter-chamfering cutter in which the cutting plane is not parallel to the direction of the tool axis AX, a machining reaction force containing not only a component acting in the advancing direction F of the tool T and a component acting in the tool radial direction D perpendicular to the advancing direction F of the tool T but also a component acting in the direction of the tool axis AX is applied from the work W to the tool T.

Furthermore, a reaction force containing major components acting in the direction of the tool axis AX and the tool radial direction D, respectively, is applied from the copying mold J1 to the copying guide 8. Consequently, as the respective reaction forces from the work W and the copying mold J1, a three-dimensional reaction force containing components acting in the advancing direction F of the tool T, the tool radial direction D perpendicular to the advancing direction F of the tool T, and the direction of the tool axis AX, respectively, is indirectly applied to the arm 4 through the tool T, the rotating mechanism 7, and the forwarding mechanism 6.

Accordingly, a force sensor 9 that is capable of detecting a force acting in three axial directions that are orthogonal to one another may be attached to the attaching jig 5 at the tip of the arm 4. In the example illustrated in FIG. 1, the attaching jig 5 is attached to the arm 4 with a stepped disc-shaped force sensor 9 interposed therebetween. Therefore, during profile copying performed on the work W with the tool. T by moving the arm 4 while keeping the copying guide 8 and the copying mold J1 on the work W in contact with each other, the force sensor 9 can detect the force applied from the tool T to the arm 4. In addition, during the profile copying performed on the work W, the force sensor 9 can also detect the force applied from the copying mold J1 to the arm 4.

In the example illustrated in FIG. 1, the casing 6A of the forwarding mechanism 6 having thereinside the rotating mechanism 7 configured to rotate the tool T is attached such that the tool axis AX becomes perpendicular to the coupling surface of the force sensor 9. In contrast, in the example illustrated in FIG. 2, the casing 6A of the forwarding mechanism 6 having thereinside the rotating mechanism 7 configured to rotate the tool T is attached to the attaching jig 5 such that the tool axis AX becomes parallel to the coupling surface of the force sensor 9. That is, the orientations of the tool T, the rotating mechanism 7, and the forwarding mechanism 6 with respect to the arm 4 may be determined flexibly in accordance with the respective configurations of the work W, the copying guide 8, and the copying mold J1.

If the three axial directions in which force is detectable by the force sensor 9 are made to coincide with or are associated with the advancing direction F of the tool T, the tool radial direction D perpendicular to the advancing direction F of the tool T, and the direction of the tool axis AX, respectively, the force sensor 9 becomes capable of detecting components of the reaction force that act in the advancing direction F of the tool T, the tool radial direction D perpendicular to the advancing direction F of the tool T, and the direction of the tool axis AX, respectively. Specifically, as illustrated in FIG. 2, if the force sensor 9 is capable of detecting a force acting in the X-axis direction, the Y-axis direction, and the Z-axis direction that are orthogonal to one another, the tool T is to be attached to the arm 4 such that the advancing direction F of the tool T becomes parallel to the X-axis direction, the tool radial direction D perpendicular to the advancing direction F of the tool T becomes parallel to the Y-axis direction, and the direction of the tool axis AX becomes parallel to the Z-axis direction.

The force detected by the force sensor 9 is outputted to the control system 3. The control system 3 is capable of controlling the arm 4 in accordance with the force detected by the force sensor 9.

Figure 3:
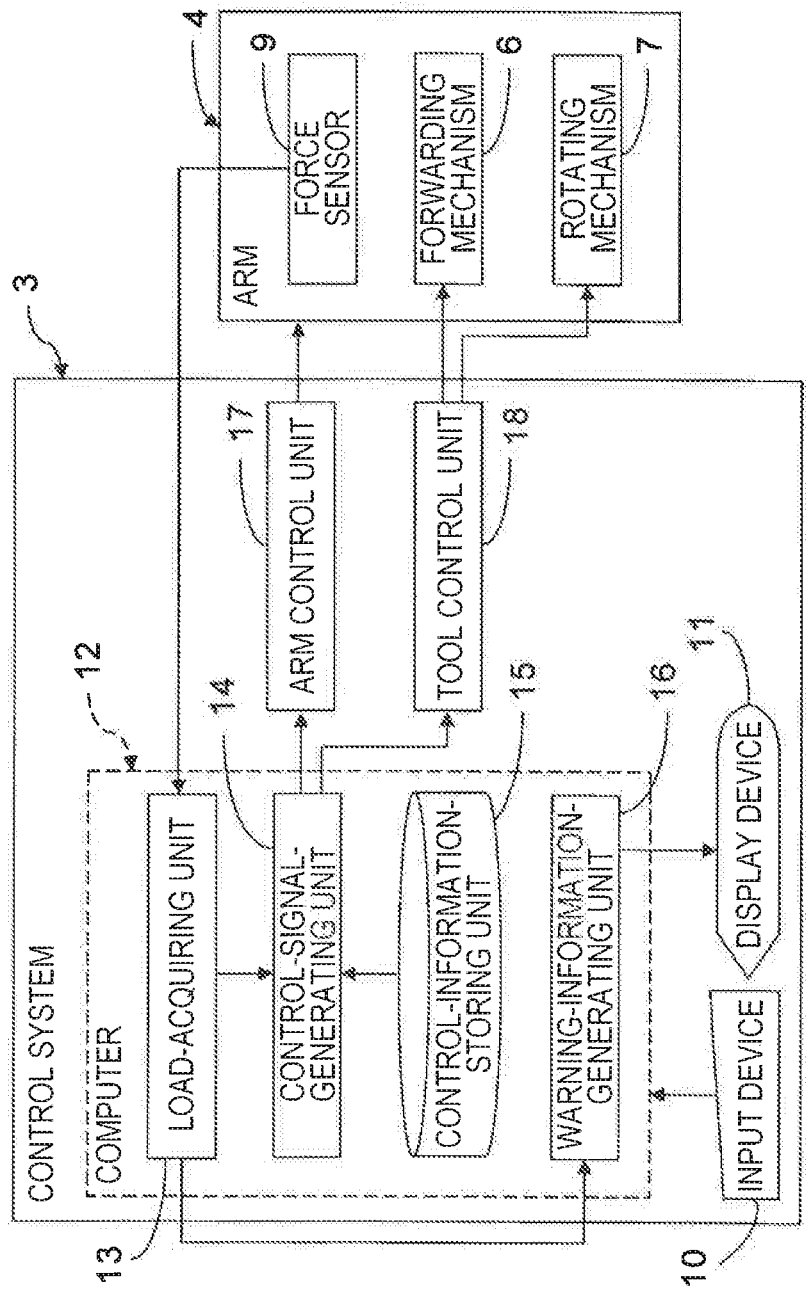
FIG. 3 is a functional block diagram of a control system included in the machining robot illustrated in FIG. 1.

FIG. 3 is a functional block diagram of the control system 3 included in the machining robot 1 illustrated in FIG. 1.

The control system 3 may include a computer 12 to which an input device 10 and a display device 11 are connected. An arithmetic unit, such as a CPU (central processing unit) of the computer 12, serves as a load-acquiring unit 13, a control-signal-generating unit 14, a control-information-storing unit 15, and a warning-information-generating unit 16 by reading and executing programs for controlling the robot 2.

The control system 3 further includes an arm control unit 17 and a tool control unit 18. The arm control unit 17 may be provided as a function of the computer 12. That is, a processing circuit and associated elements that read a control program for configuring the arm control unit 17 may also serve as the processing circuit and associated elements serving as the load-acquiring unit 13, the control-signal-generating unit 14, the control-information-storing unit 15, and the warning-information-generating unit 16.

The load-acquiring unit 13 has a function of acquiring the force detected by the force sensor 9 and notifying the control-signal-generating unit 14 and the warning-information-generating unit 16 of the force. Specifically, the load-acquiring unit 13 acquires from the force sensor 9 a force containing a component in the advancing direction F of the tool T, a component in the tool radial direction D perpendicular to the advancing direction F of the tool T, and a component in the direction of the tool axis AX, and notifies the control-signal-generating unit 14 and the warning-information-generating unit 16 of the acquired force containing the components acting in the three directions.

The control-signal-generating unit 14 has a function of controlling the arm 4, the forwarding mechanism 6, and the rotating mechanism 7 in accordance with a machining control program stored as control information in the control-information-storing unit 15.

To perform cutting on a work W with the machining robot 1 holding the rotational tool T, not only the arm 4 but also the forwarding mechanism 6 and the rotating mechanism 7 need to be controlled. Accordingly, a machining control program including a control program for the arm 4, a control program for the forwarding mechanism 6, and a control program for the rotating mechanism 7 is generated. The generated machining control program can be stored as control information for the machining robot 1 in the control-information-storing unit 15.

The control-signal-generating unit 14 has a function of generating respective control signals for the arm 4, the forwarding mechanism 6, and the rotating mechanism 7 by referring to and in accordance with the machining control program stored in the control-information-storing unit 15, and a function of outputting the control signal generated for the arm 4 to the drive unit of the arm 4 through the arm control unit 17 and outputting the control signals generated for the forwarding mechanism 6 and the rotating mechanism 7 to the forwarding mechanism 6 and the rotating mechanism 7, respectively, through the tool control unit 18.

In particular, the control-signal-generating unit 14 has a function of automatically controlling the arm 4 such that profile copying is performed, by generating a control signal for the arm 4 regarding the profile copying in accordance with the force notified of by the load-acquiring unit 13 and with the control program for the arm 4 regarding the profile copying, and by outputting the generated control signal to the arm 4.

The control program for the arm 4 regarding the profile-copying is a program of teaching a locus and a traveling speed of the arm 4 such that the copying guide 8 travels while being kept in contact with the copying mold J1. Specifically, the control program regarding profile copying is a program for teaching a traveling direction and a traveling speed of the arm 4 by specifying a position and a speed to teach. Accordingly, the control program for profile copying is generated in accordance with information on the shape of the copying mold J1.

For example, if the copying mold J1 is to be used in a linear machining process, a profile-copying control program of teaching a spatial position and a traveling direction of the arm 4 may be generated in accordance with the spatial position of the contact surface between the copying mold J1 and the copying guide 8. If the copying mold J1 is to be used in a machining process for obtaining a curved line or that accompanies changes in the direction of the tool axis AX, a profile-copying control program of teaching a spatial position and a traveling direction of the arm 4 may be generated in accordance with information on the two-dimensional or three-dimensional shape of the contact surface between the copying mold J1 and the copying guide 8.

The control program for the arm 4 regarding the profile-copying generated as above can be stored in the control-information-storing unit 15 so as to be referred to by the control-signal-generating unit 14 when the profile copying is to be performed on the work W. Note that, as described above, in the case of profile copying performed on the work W, the control-signal-generating unit 14 generates a control signal for the arm 4 in accordance with not only the control program for the arm 4 regarding the profile-copying but also the force acquired from the force sensor 9 through the load-acquiring unit 13.

The control-signal-generating unit 14 is capable of acquiring the force containing the component in the advancing direction F of the tool T, the component in the tool radial direction D perpendicular to the advancing direction F of the tool T, and the component in the direction of the tool axis AX from the force sensor 9 through the load-acquiring unit 13. As illustrated in FIG. 2, if the advancing direction F of the tool T, the tool radial direction D perpendicular to the advancing direction F of the tool T, and the direction of the tool axis AX coincide with the X-axis direction, the Y-axis direction, and the Z-axis direction, respectively, in which force is detectable by the force sensor 9, the force in the advancing direction F of the tool T, the force in the tool radial direction D perpendicular to the advancing direction F of the tool T, and the force in the direction of the tool axis AX can be obtained directly in accordance with the force containing the three orthogonal components acquired from the force sensor 9 through the load-acquiring unit 13.

If the advancing direction F of the tool T, the tool radial direction D perpendicular to the advancing direction F of the tool T, and the direction of the tool axis AX are inclined at or rotated by known fixed angles with respect to the X-axis direction, the Y-axis direction, and the Z-axis direction, respectively, in which force is detectable by the force sensor 9, the force in the advancing direction F of the tool T, the force in the tool radial direction D perpendicular to the advancing direction F of the tool T, and the force in the direction of the tool axis AX can be obtained through coordinate transformation.

Even in a case where the geometrical relationship between a set of the advancing direction F of the tool T, the tool radial direction D perpendicular to the advancing direction F of the tool T, and the direction of the tool axis AX and a set of the X-axis direction, the Y-axis direction, and the Z-axis direction in which force is measurable by the force sensor 9 changes during copying, the advancing direction F of the tool T, the tool radial direction D perpendicular to the advancing direction F of the tool T, and the direction of the tool axis AX can be identified from information on the shape of at least one of the copying mold J1 or the work W to be obtained after the machining. Therefore, the force in the advancing direction F of the tool T, the force in the tool radial direction D perpendicular to the advancing direction F of the tool T, and the force in the direction of the tool axis AX can be obtained through coordinate transformation.

Figure 4:
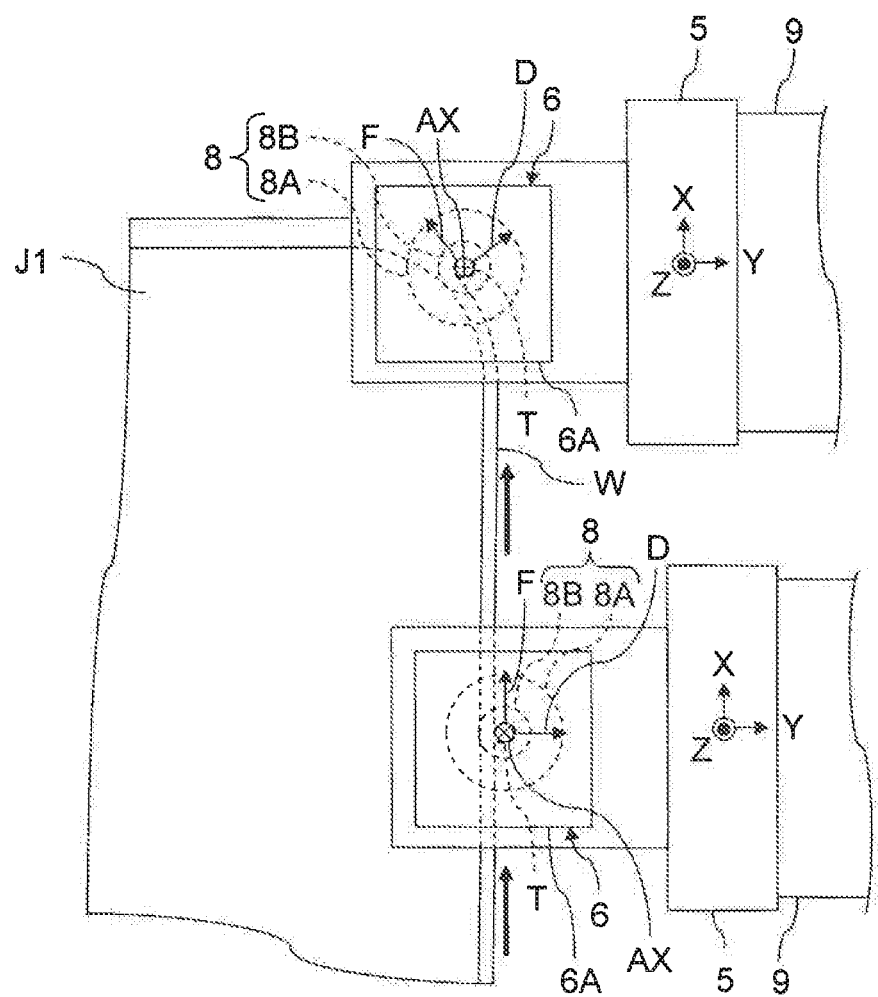
FIG. 4 illustrates a method of obtaining a reaction force acting in a tool advancing direction and a reaction force acting in a tool radial direction in a case where the tool advancing direction changes during profile copying performed with the machining robot illustrated in FIG. 2.

FIG. 4 illustrates a method of obtaining the reaction force acting in the advancing direction F of the tool T and the reaction force acting in the tool radial direction D in the case where the advancing direction F of the tool T changes during profile copying performed with the machining robot 1 illustrated in FIG. 2.

As illustrated in FIG. 4, if trimming for obtaining a profile with a round-chamfered corner is performed by copying with the copying mold J1, the advancing direction F of the tool T changes along the profile of the work W to be obtained after the machining and in the direction of a tangent to the copying mold J1. In such a case, the direction of the reaction force applied to the copying guide 8 in the tool radial direction D coincides with the direction of a line normal to the cut surface of the work W, i.e., the surface of the work W to be obtained after the machining and the surface of the copying mold J1.

Therefore, if profile trimming is performed with the orientation of the force sensor 9 being unchanged and with the direction of the tool axis AX coinciding with the Z-axis direction, changes occur in the relative relationship between a set of the X-axis direction and the Y-axis direction in which force is detectable by the force sensor 9 and a set of the advancing direction F of the tool T and the tool radial direction D in which the copying guide 8 receives the reaction force.

In such a case, in accordance with the two-dimensional shape of the copying mold J1 or the work W to be obtained after the machining, a direction perpendicular to the surface of the work W to be obtained after the machining or the surface of the copying mold J1 can be identified as the tool radial direction D in which the tool T and the copying guide 8 receive reaction forces from the work W and the copying mold J1, respectively. Alternatively, in accordance with the taught position of the tool T that is identified from the control program for the arm 4, a direction perpendicular to the surface of the work W or the surface of the copying mold J1 may be identified as the tool radial direction D in which the tool. T and the copying guide 8 receive reaction forces from the work W and the copying mold J1, respectively. The reaction force acting in the identified tool radial direction D can be obtained by vector calculation in accordance with values detected for the X-axis direction and the Y-axis direction, respectively.

Figure 5:
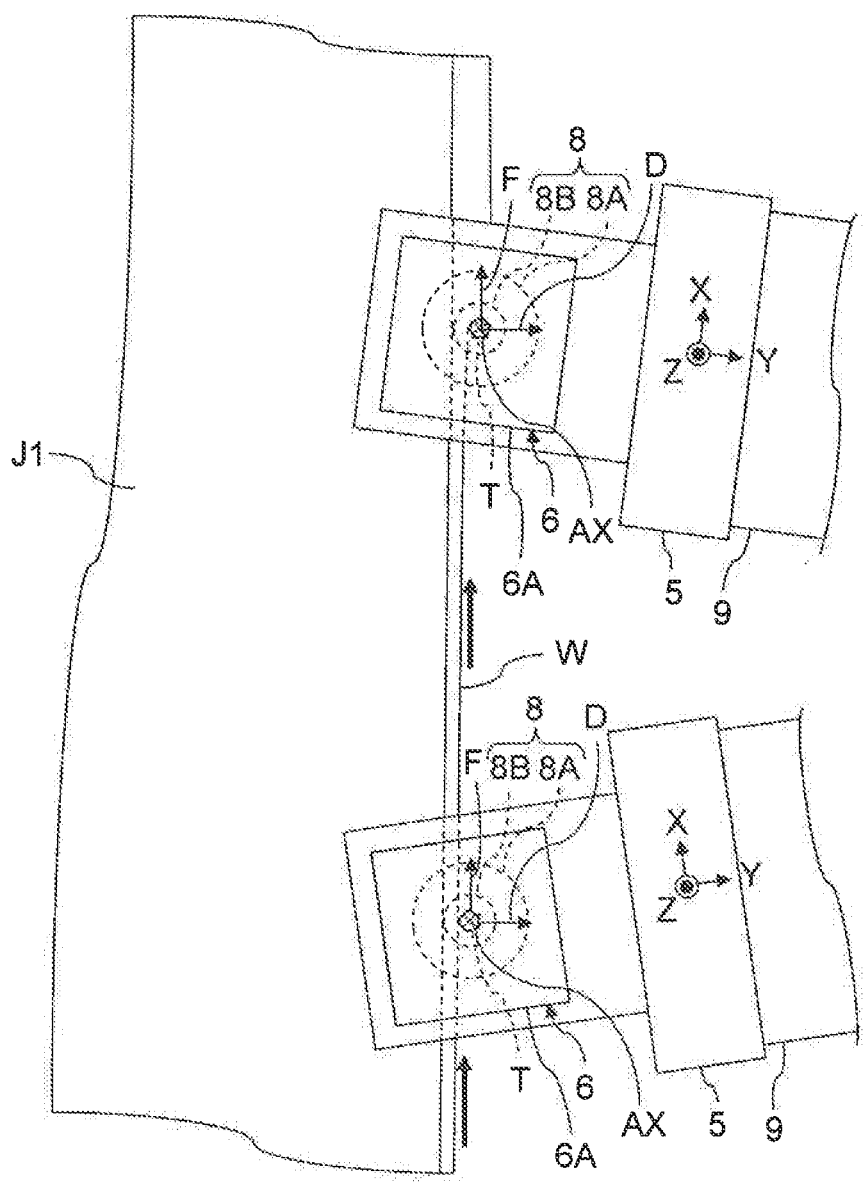
FIG. 5 illustrates an exemplary case where the orientation of a force sensor changes while the tool advancing direction does not change during profile copying performed with the machining robot illustrated in FIG. 2.

FIG. 5 illustrates an exemplary case where the orientation of the force sensor 9 changes while the advancing direction F of the tool T does not change during profile copying performed with the machining robot 1 illustrated in FIG. 2.

Even if the advancing direction F of the tool T does not change during profile copying, the orientation of the force sensor 9 may change as illustrated in FIG. 5, depending on the position of an axis on which the arm 4 is moved. Specifically, if the force sensor 9 is translationally immovable in the advancing direction F of the tool T because of any restrictions imposed on the axis on which the arm 4 is moved, the orientation of the force sensor 9 changes even if the advancing direction F of the tool T is linear and does not change. In such a case as well, the direction perpendicular to the surface of the work W or the surface of the copying mold J1 can be identified as the tool radial direction D in which the tool T and the copying guide 8 receive reaction forces from the work W and the copying mold J1, respectively, in accordance with the shape of the copying mold J1, the shape of the work W to be obtained after the machining, or the taught position of the tool T. Accordingly, the reaction force in the identified tool radial direction D can be obtained by vector calculation in accordance with values detected as the respective forces in the X-axis direction and the Y-axis direction.

The advancing direction F of the tool T, the tool radial direction D perpendicular to the advancing direction F of the tool T, and the direction of the tool axis AX may be detected in accordance with changes with time in the forces detected as the three vector components by the force sensor 9. In that case, the force in the advancing direction F of the tool T, the force in the tool radial direction D perpendicular to the advancing direction F of the tool T, and the force in the direction of the tool axis AX can be obtained without using the information on the shapes of the copying mold J1 and the work W.

The control-signal-generating unit 14 has a function of obtaining the force in the advancing direction F of the tool T, the force in the tool radial direction D perpendicular to the advancing direction F of the tool T, and the force in the direction of the tool axis AX in accordance with the force detected by the force sensor 9, as described above. Accordingly, the control-signal-generating unit 14 can control the arm 4 in accordance with the direction of the force applied to the arm 4.

For example, during cutting performed on the work W, as the forwarding speed in the advancing direction F of the tool T becomes higher, the cutting resistance increases and the reaction force applied from the work W to the tool T increases. Even if the forwarding speed in the advancing direction F of the tool T is constant, the reaction force applied from the work W to the tool T increases if the thickness of the plate-shaped work W changes or if the machining allowance in the work W is increased. Furthermore, if the tool T wears and becomes dull, the reaction force applied from the work W to the tool T increases.

If the reaction force applied from the work W to the tool T becomes excessively large, vibrations such as chattering occur in the tool T. If the tool T vibrates, even in profile copying performed with the copying guide 8 and the copying mold J1, the roughness of the machined surface increases, deteriorating the quality of the finished or half-finished product, i.e., the work W obtained after the machining. Therefore, to obtain the required quality of the finished or half-finished product, it is important to prevent the tool T from receiving an excessively large reaction force. To reduce the reaction force to be applied to the tool T, the forwarding speed in the advancing direction F of the tool T may be reduced.

However, an excessive reduction of the forwarding speed in the advancing direction F of the tool T leads to an increase in the time for machining of the work W, i.e., a reduction in the machining efficiency. Hence, from the viewpoint of improving the efficiency in the machining of the work W, it is preferable to increase the forwarding speed in the advancing direction F of the tool T such that the reaction force to be applied to the tool T does not become excessively large.

That is, to simultaneously realize the assured quality in the machining of the work W and the improvement in the machining efficiency, the ideal forwarding speed in the advancing direction F of the tool T is considered to vary with conditions for machining of the work W. Under such a situation, to change the taught speed in accordance with machining conditions in the control program for the arm 4, a very complicated and unfeasible process accompanying the setting of a number of parameters for defining the machining conditions is necessary.

Hence, the control-signal-generating unit 14 can be configured to generate the control signal for the arm 4 regarding the profile-copying such that the advancing speed of the tool T becomes a predetermined control value, in accordance with the force in the advancing direction F of the tool T that is directly measured by the force sensor 9 or indirectly acquired by the force sensor 9 through a process of coordinate transformation or the like. That is, in profile copying, the advancing speed of the tool T is automatically adjustable such that the reaction force in the advancing direction F of the tool T does not become excessively large.

Specific examples of the method of automatically adjusting the advancing speed of the tool T include a method of automatically controlling the advancing speed of the tool T such that the reaction force in the advancing direction F of the tool T falls within a predetermined range. In that case, the control-signal-generating unit 14 may be configured to determine the control value for the advancing speed of the tool T such that the force in the advancing direction F of the tool T that is acquired through the force sensor 9 becomes constant or falls within a predetermined range, and to generate a control signal for the arm 4 regarding the profile-copying such that the advancing speed of the tool T becomes the determined control value for the advancing speed of the tool T. That is, the advancing speed of the tool T may be feedback-controlled such that the force in the advancing direction F of the tool T becomes constant or falls within a predetermined range.

Actually, an experiment of profile trimming on the work W made of CFRP was conducted with each of a diamond tool and a cemented carbide tool as the tool T. As a result, it has been found that a good cut surface can be obtained with no excessive vibrations in the tool T by automatically adjusting the traveling speed of the arm 4 such that, in the case of the diamond tool as the tool T, the reaction force applied to the diamond tool becomes 3 kgf or greater and 10 kgf or smaller, or by automatically adjusting the traveling speed of the arm 4 such that, in the case of the cemented carbide tool as the tool T, the reaction force applied to the cemented carbide tool becomes 3 kgf or greater and 5 kgf or smaller. Therefore, if a profile-trimming copying process is to be performed on a work W made of CFRP, it is preferable to perform profile trimming on the work W under the above condition so as to obtain a finished or half-finished product made of a composite material.

A cemented carbide alloy is a material obtained by mixing an additive such as titanium carbide or tantalum carbide with tungsten carbide powder and sintering the mixture with cobalt. The diamond tool is a tool obtained by shaping a single-crystalline diamond or by mixing an additive such as cobalt with diamond fine powder and sintering the mixture into a polycrystalline sintered compact.

In another specific example of the method of automatically adjusting the advancing speed of the tool T, the advancing speed of the tool T is changed to a predetermined speed in accordance with the force acting in the advancing direction F of the tool T.

FIG. 6 is a graph illustrating a method of controlling the arm 4 of the machining robot 1 illustrated in FIG. 1.

In FIG. 6, the horizontal axis represents the value detected as the force (kgf) acting in the advancing direction F of the tool T, and the vertical axis represents the control value for the advancing speed of the tool T. As illustrated in FIG. 6, a table or a function in which the force applied to the arm 4 in the advancing direction F of the tool T and the control value for the advancing speed of the tool T are associated with each other may be prepared. The table or the function thus prepared can be stored in the control-information-storing unit 15.

In the example illustrated in FIG. 6, if the force acting in the advancing direction F of the tool T is 3.5 kgf or smaller and the reaction force from the work W is therefore small, the advancing speed of the tool T is determined to be the speed taught by the user as a parameter in the control program. In contrast, if the force acting in the advancing direction F of the tool T is 5.5 kgf or greater and the reaction force from the work W is therefore large, the advancing speed of the tool T is determined to be 50% of the taught speed, from the viewpoint of controlling vibrations of the tool T. If the force acting in the advancing direction F of the tool T is 3.5 kgf or greater and 5.5 kgf or smaller, the advancing speed of the tool T is determined to change linearly from 100% to 50% of the taught speed. That is, in the example illustrated in FIG. 6, a program of controlling the advancing speed of the tool T is generated such that the advancing speed of the tool T is automatically reduced gradually to 50% of the taught speed if the force acting in the advancing direction F of the tool T exceeds a threshold.

Of course, as an alternative to the example illustrated in FIG. 6, the force applied to the arm 4 in the advancing direction F of the tool T and the control value for the advancing speed of the tool T may be associated with each other by using any function or the like in accordance with the result of a cutting experiment or the like. For example, as the force applied in the advancing direction F of the tool T increases, the control value for the advancing speed of the tool T may be reduced in a stepwise manner or in a curved manner. As another alternative, a table summarizing values of the force applied in the advancing direction F of the tool T in association with control values for the advancing speed of the tool T may be prepared.

As described above, if a table or a function representing the association between the force applied to the arm 4 in the advancing direction F of the tool T and the control value for the advancing speed of the tool T is prepared and stored in the control-information-storing unit 15, the control-signal-generating unit 14 can determine, in accordance with the table or the function stored in the control-information-storing unit 15, a control value for the advancing speed of the tool T that corresponds to the force in the advancing direction F of the tool T that is actually acquired by the force sensor 9 during copying. Accordingly, the control-signal-generating unit 14 can generate a control signal for the arm 4 regarding the profile-copying such that the advancing speed of the tool T becomes the determined control value for the advancing speed of the tool T.

If the force applied to the arm 4 in the advancing direction F of the tool T is extremely large, vibrations of the tool T might not be suppressed satisfactorily even if the advancing speed of the tool T is reduced. Hence, the control-signal-generating unit 14 may have a function of aborting the profile copying by stopping the movement of the arm 4 if the force in the advancing direction F of the tool T acquired by the load-acquiring unit 13 is greater than or equal to a threshold or exceeds the threshold. That is, the control-signal-generating unit 14 may have a function of generating a control signal that stops the movement of the arm 4 and outputting the control signal to the arm control unit 17 if the force in the advancing direction F of the tool T acquired by the load-acquiring unit 13 is greater than or equal to a threshold or exceeds the threshold.

Of course, from the viewpoint of avoiding a situation such as interference with the tool T or the copying guide 8 due to errors in the setting of the work W or the copying mold J1, the control operation of stopping the movement of the arm 4 may also be performed if the force in the tool radial direction D perpendicular to the advancing direction F of the tool T or the force in the direction of the tool axis AX is greater than or equal to respective thresholds or exceed the thresholds.

As described above, the control-signal-generating unit 14 is capable of obtaining not only the reaction force in the advancing direction F of the tool T but also the reaction force in the tool radial direction D perpendicular to the advancing direction F of the tool T and the reaction force in the direction of the tool axis AX. Therefore, the control-signal-generating unit 14 can perform not only feedback control of the arm 4 in accordance with the reaction force in the advancing direction F of the tool T but also feedback control of the arm 4 in accordance with the reaction force in the tool radial direction D perpendicular to the advancing direction F of the tool T and feedback control of the arm 4 in accordance with the force in the direction of the tool axis AX.

The rigidity of the arm 4 having a cantilever structure is extremely smaller than the rigidity of the main shaft of the machine tool. Therefore, if the arm 4 is controlled only in accordance with the control program, an error occurs between the actual position of the tool T and the position of the tool T that is taught by the control program, because the arm 4 warps under the machining reaction force, the weight of the arm 4 itself, and so forth. Such an error attributed to the positioning accuracy of the arm 4 is not negligible in the machining of the work W in which a machining accuracy represented by a tolerance of about ±0.1 mm to ±1.0 mm is required. In particular, in profile copying, if the arm 4 is controlled only in accordance with the control program, the copying guide 8 might not assuredly come into contact with the copying mold J1.

Accordingly, force control of the arm 4 in accordance with the reaction force in the tool radial direction D perpendicular to the advancing direction F of the tool T and force control of the arm 4 in accordance with the reaction force in the direction of the tool axis AX are performed, whereby the copying guide 8 can be assuredly pressed against the copying mold J1 with an appropriate force during copying.

Specifically, the control-signal-generating unit 14 is capable of determining a control value for the position in the tool radial direction D perpendicular to the advancing direction F of the tool T such that the force in the tool radial direction D perpendicular to the advancing direction F of the tool T that is acquired through the force sensor 9 becomes constant or falls within a predetermined range. That is, the control-signal-generating unit 14 is capable of performing a correction in which the position of the tool T that is to be taught by the control program is offset in the tool radial direction D perpendicular to the advancing direction F of the tool T such that the reaction force in the tool radial direction D perpendicular to the advancing direction F of the tool T becomes constant or falls within a predetermined range. Furthermore, the control-signal-generating unit 14 is capable of setting the corrected position as a control value for the position in the tool radial direction D perpendicular to the advancing direction F of the tool T. Furthermore, the control-signal-generating unit 14 is capable of generating a control signal for the arm 4 regarding the profile-copying such that the position in the tool radial direction D perpendicular to the advancing direction F of the tool T becomes the determined control value for the position in the tool radial direction D perpendicular to the advancing direction F of the tool T, and outputting the control signal to the arm control unit 17.

That is, the arm 4 can be feedback-controlled such that the reaction forces in the tool radial direction D that are applied from the copying mold J2 and the work W to the copying guide 8 and the tool T, respectively, become constant or fall within respective predetermined ranges. Therefore, during copying, the copying guide 8 can be assuredly pressed against the copying mold J1 in the tool radial direction D with an appropriate force that is constant or within a predetermined range.

Likewise, the control-signal-generating unit 14 is capable of determining a control value for the position of the tool T in the direction of the tool axis AX such that the force of the tool T in the direction of the tool axis AX that is acquired through the force sensor 9 becomes constant or falls within a predetermined range. That is, the control-signal-generating unit 14 is capable of performing a correction in which the position of the tool T that is to be taught by the control program is offset in the direction of the tool axis AX such that the reaction force in the direction of the tool axis AX becomes constant or falls within a predetermined range. Furthermore, the control-signal-generating unit 14 is capable of setting the corrected position as a control value for the position of the tool T in the direction of the tool axis AX. Furthermore, the control-signal-generating unit 14 is capable of generating a control signal for the arm 4 regarding the profile-copying such that the position of the tool T in the direction of the tool axis AX becomes the determined control value for the position of the tool T in the direction of the tool axis AX, and outputting the control signal to the arm control unit 17.

That is, the arm 4 can be feedback-controlled such that the reaction force in the direction of the tool axis AX that is applied from the copying mold J1 to the copying guide 8 becomes constant or falls within a predetermined range. Therefore, during copying, the copying guide 8 can be assuredly pressed against the copying mold J1 in the direction of the tool axis AX with an appropriate force that is constant or within a predetermined range.

In the force control in which the copying guide 8 is pressed against the copying mold J1 in at least one of the tool radial direction D or the direction of the tool axis AX with an appropriate force that is constant or within a predetermined range, the copying mold J1 and the work W need to be strong enough not to be deformed under the force applied thereto. Furthermore, the copying mold J1 and the work W need to be fixed so as not to be displaced when the force determined in the force control is applied thereto. Hence, the force to be applied in the force control needs to be determined as such a force that the copying mold J3 and the work W are neither deformed nor displaced.

The positioning of the tool T in the direction of the tool axis AX is not limited to be performed by moving the arm 4 and may be performed by moving the forwarding mechanism 6. Accordingly, the control-signal-generating unit 14 is capable of automatically controlling the forwarding mechanism 6 in accordance with the reaction force of the tool T in the direction of the tool axis AX that is acquired through the force sensor 9.

A typical example of the case where the positioning of the tool T in the direction of the tool axis AX is performed by moving the forwarding mechanism 6 is drilling. This is because of the following reason. In drilling, the accuracy in the positioning of the tool T in the direction of the tool axis AX is extremely higher with a linear movement of the forwarding mechanism 6 than with a linear movement of the arm 4 that accompanies interpolation.

Therefore, in the case of drilling of the work W with the tool T, the control-signal-generating unit 14 can determine a control value for the forwarding speed of the forwarding mechanism 6 such that the force of the tool T in the direction of the tool axis AX that is acquired through the force sensor 9 becomes constant or falls within a predetermined range. Then, the control-signal-generating unit 14 can generate a control signal for the forwarding mechanism 6 regarding the drilling such that the determined control value for the forwarding speed is reached, and can output the control signal to the forwarding mechanism 6. Thus, the drilling of the work W with the tool T can be performed while the reaction force of the tool T in the direction of the tool axis AX is kept as constant as possible.

The arm control unit 17 of the control system 3 has a function of controlling the arm 4 by outputting the control signal for the arm 4 that is generated by the control-signal-generating unit 14 to the drive unit of the arm 4. On the other hand, the tool control unit 18 has a function of controlling the forwarding mechanism 6 and the rotating mechanism 7 by outputting the control signals for the forwarding mechanism 6 and the rotating mechanism 7 that are generated by the control-signal-generating unit 14 to the forwarding mechanism 6 and the rotating mechanism 7, respectively. If the forwarding mechanism 6 and the rotating mechanism 7 are both pneumatic as illustrated in FIG. 1, the tool control unit 18 is given a function of converting the control signals generated by the control-signal-generating unit 14 from electric signals into air signals and outputting the air signals to the forwarding mechanism 6 and the rotating mechanism 7, respectively.

The warning-information-generating unit 16 has a function of acquiring the force in the advancing direction F of the tool T in accordance with the force acquired by the load-acquiring unit 13, and outputting warning information as a warning message to the display device 11 if the force in the advancing direction F of the tool T is greater than or equal to a threshold or exceeds the threshold. Alternatively, the warning-information-generating unit 16 may output the warning information as an optical, sound, or voice message to an output device such as a lamp or a speaker, instead of or in addition to the display device 11.

As described above, if the force applied to the arm 4 in the advancing direction F of the tool T is excessively large, the tool T may vibrate, leading to a possibility of deterioration in the machining quality. Hence, before the arm 4 is stopped, warning information can be outputted. Of course, from the viewpoint of avoiding a situation such as interference with the tool T and the copying guide 8 due to errors in the setting of the work W and the copying mold J1, warning information may also be outputted before the arm 4 is stopped if the force in the tool radial direction D perpendicular to the advancing direction F of the tool T and the force in the direction of the tool axis AX are greater than or equal to respective thresholds or exceed the thresholds.

The threshold for judging whether to output the warning information by the warning-information-generating unit 16 may be set to be smaller than the threshold for judging whether to stop the arm 4 by the control-signal-generating unit 14. That is, the warning-information-generating unit 16 may output warning information if the force acquired by the load-acquiring unit 13 is greater than or equal to a first threshold or exceeds the first threshold, whereas the control-signal-generating unit 14 may control the arm 4 to stop moving if the force acquired by the load-acquiring unit 13 is greater than or equal to a second threshold greater than the first threshold or exceeds the second threshold.

To perform a threshold-based operation for each of the force in the advancing direction F of the tool T, the force in the tool radial direction D perpendicular to the advancing direction F of the tool T, and the force in the direction of the tool axis AX, the first threshold and the second threshold are to be set for each of the force in the advancing direction F of the tool T, the force in the tool radial direction D) perpendicular to the advancing direction F of the tool T, and the force in the direction of the tool axis AX.

The entirety or part of the control program for realizing the functions of the control system 3 described above may be stored in an information-storing medium and be commercially distributed as a program product. For example, a control program that causes the control system 3 to execute the following steps may be commercially distributed as a program product: a step of acquiring the force applied to the arm 4 and detected by the force sensor 9 during profile copying; and a step of automatically controlling the arm 4 such that profile copying is performed, by generating a control signal for the arm 4 regarding the profile-copying in accordance with the acquired force and with the control information for the arm 4 regarding the profile-copying, and by outputting the generated control signal to the arm 4. Accordingly, if a control system for a prior-art robot is made to read the control program for the robot 2, the prior-art robot can also have the control function for profile copying. Therefore, if the forwarding mechanism 6, the rotating mechanism 7, the copying guide 8, and the tool T are attached to the prior-art robot, the machining robot 1 can be obtained.

(Method of Machining with Machining Robot and Method of Controlling Robot with Robot Control System)

To perform profile copying on the work W by controlling the robot 2, the work W is set, and the copying mold J1 is set at a predetermined position of the work W. Specifically, as illustrated in FIG. 2, the work W is fixed to the plate-shaped jig J3 fixed to the machining table J2, and the copying mold J1 is fixed to the work W. On the other hand, the forwarding mechanism 6, the rotating mechanism 7, the copying guide 8, and the rotational tool T are attached to the arm 4, including the force sensor 9, with the attaching jig 5 interposed therebetween.

Furthermore, a control program of teaching a locus of the arm 4 such that the copying guide 8 moves while being kept in contact with the copying mold J1 is generated by the user. The generated control program for the arm 4 is written as a machining control program into the control-information-storing unit 15, together with a control program for the forwarding mechanism 6 and a control program for the rotating mechanism 7, through an operation performed on the input device 10.

Then, in accordance with the control program for the arm 4 stored in the control-information-storing unit 15, the control-signal-generating unit 14 generates an initial control signal for the arm 4 so that the tool T is moved along a path that is offset from the end face of the copying mold J1 by a length corresponding to the thickness of the copying guide 8. The generated initial control signal for the arm 4 is outputted to the drive unit of the arm 4 through the arm control unit 17.

Furthermore, in accordance with the control program for the forwarding mechanism 6 and the control program for the rotating mechanism 7 stored in the control-information-storing unit 15, the control-signal-generating unit 14 generates control signals for the forwarding mechanism 6 and the rotating mechanism 7, respectively, such that the tip of the tool T rotates in a state of being forwarded to a required position. The generated control signals for the forwarding mechanism 6 and the rotating mechanism 7 are outputted to the forwarding mechanism 6 and the rotating mechanism 7, respectively, through the tool control unit 18.

Accordingly, the arm 4 moves, and the tool T moves to the initial taught position. Furthermore, the tip of the tool T is forwarded to the required position and is rotated.

The control-signal-generating unit 14 further generates a control signal for the arm 4 so that the tool T is moved along the taught locus in accordance with the control program. The generated control signal for the arm 4 is outputted to the drive unit of the arm 4 through the arm control unit 17. Accordingly, the arm 4 moves, and the tool T advances in the direction taught by the control program while the copying guide 8 is kept in contact with the copying mold J1. Thus, profile copying on the work W with the rotating tool T is started.

When the tool T advances and comes into contact with the work W, a machining reaction force is applied to the tool T from the work W. Furthermore, a reaction force corresponding to the pressing force is applied from the copying mold J1 to the copying guide 8. The reaction forces applied to the tool T and the copying guide 8 are transmitted to the arm 4. Consequently, a force is applied from the tool T and the copying guide 8 to the arm 4.

The force applied from the tool T to the arm 4 during profile copying is detected by the force sensor 9 attached to the arm 4. The force detected by the force sensor 9 is outputted to the control system 3 provided for the robot 2. Then, the load-acquiring unit 13 acquires the value detected as the force outputted from the force sensor 9 and supplies the value to the control-signal-generating unit 14.

When the control-signal-generating unit 14 acquires the value detected as the force outputted from the force sensor 9, the control-signal-generating unit 14 detects the force in the advancing direction F of the tool T, the force in the tool radial direction D perpendicular to the advancing direction F of the tool T, and the force in the direction of the tool axis AX in accordance with the acquired value detected as the force. Then, the control-signal-generating unit 14 automatically controls the arm 4 in accordance with the force in the advancing direction F of the tool T, the force in the tool radial direction D perpendicular to the advancing direction F of the tool T, and the force in the direction of the tool axis AX.

That is, the control-signal-generating unit 14 generates a control signal for the arm 4 regarding the profile-copying in accordance with not only the control program for the arm 4 regarding the profile-copying but also the force acquired from the load-acquiring unit 13. The generated control signal for the arm 4 is outputted to the drive unit of the arm 4 through the arm control unit 17. Accordingly, profile copying accompanying the force control of the arm 4 is performed.

Specifically, the traveling speeds of the arm 4 and the tool T are automatically adjusted in accordance with the force in the advancing direction F of the tool T. For example, the traveling speeds of the arm 4 and the tool T are feedback-controlled such that the reaction force in the advancing direction F of the tool T becomes constant or falls within a predetermined range. Alternatively, if the reaction force in the advancing direction F of the tool T is excessively large, the advancing speed of the tool T is reduced to a speed lower than the taught speed of the tool T that is specified as a parameter in the control program for the arm 4.

Thus, the application of an excessively large reaction force to the tool T can be avoided, and the deterioration in the machining quality due to vibrations of the tool T can be prevented. Conversely, avoiding an excessive deceleration of the tool T can improve the machining efficiency.

Furthermore, the positions of the arm 4 and the tool T are automatically adjusted in accordance with the force in the tool radial direction D perpendicular to the advancing direction F of the tool T and the force in the direction of the tool axis AX. That is, the positions of the arm 4 and the tool T are finely adjusted such that the force in the tool radial direction D perpendicular to the advancing direction F of the tool T and the force in the direction of the tool axis AX become constant or fall within respective predetermined ranges. Thus, an appropriate pressing force can be applied constantly from the copying guide 8 to the copying mold J1 during profile copying. Consequently, the work W can be machined with higher dimensional accuracy. For example, the work W can be machined with a machining accuracy represented by a tolerance of about ±0.1 mm to ±1.0 mm.

When profile copying accompanying the force control of the arm 4 is finished, the work W resulting from the machining can be obtained as a finished or half-finished product.

Advantageous Effects

In the machining robot 1 and the machining method described above, profile copying on the work W is performed while the copying mold J1 placed on the work W and the copying guide 8 attached to the arm 4 of the robot 2 are brought, into contact with each other, and the movement of the arm 4 is controlled in accordance with the machining reaction force detected by the force sensor 9. Specifically, the traveling speeds of the tool T and the arm 4 are controlled such that the reaction force in the advancing direction F of the tool T does not become excessively large, and the arm 4 is controlled such that the reaction forces in the tool radial direction D perpendicular to the advancing direction F of the tool T and in the direction of the tool axis AX become constant or fall within respective predetermined ranges. Furthermore, the control system 3 and the control method for the robot 2 are conceived for controlling the arm 4 of the robot 2 intended for profile copying described above.

Therefore, the machining robot 1, the machining method, the control system 3 for the robot 2, the control method for the robot 2, and the control program for the robot 2 make it possible to realize highly accurate heavy machine cutting to be performed on the work W by using the robot 2, such as profile trimming, profile roughing, profile finishing, grooving, pocket machining, or drilling in which a reaction force from the work W is large. Consequently, machining of the work W can be automated with no large-scale machine tool.

That is, since copying is performed by bringing the copying mold J1 placed on the work W and the copying guide 8 attached to the arm 4 of the robot 2 into contact with each other, highly accurate positioning is realized even if the tool T attached to the arm 4 of the robot 2 operates with lower positioning accuracy than a machine tool. Therefore, even a work W requiring a machining accuracy represented by a tolerance of about ±0.1 mm to ±1.0 mm can be machined within the tolerance. In particular, since the copying mold J1 is placed on the work W, not only linear machining but also curved machining is possible. Therefore, cutting of the work W, such as profile trimming, for shaping the work W into a desired shape is possible.

In addition, since the arm 4 is controlled such that the reaction forces in the tool radial direction D perpendicular to the advancing direction F of the tool T and in the direction of the tool axis AX become constant or fall within respective predetermined ranges, the copying guide 8 can be constantly pressed against the copying mold J1 with an appropriate pressing force both in the tool radial direction D and in the direction of the tool axis AX. Therefore, even heavy cutting, such as profile trimming, in which the machining reaction force is large can be performed with the arm 4 of the robot 2 that has lower rigidity than the main shaft of the machine tool. That is, profile copying, such as profile trimming, in which the machining reaction force is large and that has been therefore regarded as being difficult to perform with a less-rigid robot arm can be performed by using the arm 4 of the robot 2.

Moreover, since the traveling speeds of the tool T and the arm 4 are automatically adjusted such that the reaction force in the advancing direction F of the tool T does not become excessively large, vibrations of the tool T held by the arm 4 of the robot 2 that is less rigid than the main shaft of the machine tool can be suppressed. Consequently, machining quality as high as that obtained by using the machine tool can be obtained by using the robot 2, which is extremely less expensive than the machine tool.

Furthermore, even in a case where the thickness of the work W varies and in a case where the reaction force from the work W is not constant because of wear of the tool T or the like, the traveling speeds of the tool T and the arm 4 can be appropriately adjusted automatically in such a manner as to follow the reaction force from the work W. Such an embodiment realizes the improvement in the machining efficiency by avoiding an excessive deceleration of the tool T and the prevention of malfunctions due to the movement of the tool T at an excessively high speed, simultaneously.

Other Embodiments

While specific embodiments have been described above, the above embodiments are only exemplary and do not limit the scope of the present invention. The novel methods and apparatuses described herein can be embodied in various other modes. Furthermore, various omission, replacement, and changes can be made to the modes of the methods and apparatuses described herein, without departing from the spirit of the invention. The appended claims and equivalents thereof include such various modes and modifications as being within the scope and spirit of the invention.

For example, while the above embodiments each concern a case where the work W is machined with the rotational tool T attached to the arm 4 of the robot 2 with the rotating mechanism 7 interposed therebetween, the work W may be machined with an unrotational tool attached to the arm 4 of the robot 2. Specifically, the work W may be cut with a saw, such as a band saw or a wire saw, attached to the arm 4 of the robot 2. In that case as well, copying can be performed with a copying mold placed on the work W and a copying guide attached to the arm 4. Furthermore, automatic control of the arm 4 is also possible in accordance with respective reaction forces from the work W and the copying mold that are measured by the force sensor 9.

The invention claimed is:

1. A robot control system for a robot comprising an arm, the arm being capable of holding a tool while rotating the tool and capable of moving the tool in at least two-dimensional directions, the arm being equipped with a rotating mechanism provided for the tool, the robot control system comprising:
 a load-acquiring unit configured to acquire a force measured by a force sensor supported by the arm and configured to measure at least a force applied from the tool to the arm during profile copying performed on a machining object by using the tool and by moving the arm while a copying guide attached to the arm and a copying mold placed on the machining object are kept in contact with each other; and
 a control-signal-generating unit configured to automatically control the arm such that the profile copying is performed, by generating a control signal for the arm regarding the profile copying in accordance with the force acquired by the load-acquiring unit and with control information for the arm regarding the profile copying, and by outputting the generated control signal to the arm.

2. The robot control system according to claim 1, wherein the control-signal-generating unit is configured to generate, in accordance with a force in an advancing direction of the tool, a control signal for the arm regarding the profile copying such that an advancing speed of the tool becomes a predetermined control value.

3. The robot control system according to claim 1, wherein the control-signal-generating unit is configured to determine, in accordance with a table or a function associating a force applied to the arm in an advancing direction of the tool and a control value for an advancing speed of the tool, a control value for the advancing speed of the tool that corresponds to the force in the advancing direction of the tool that is acquired through the force sensor, and to generate a control signal for the arm regarding the profile copying such that the advancing speed of the tool becomes the determined control value for the advancing speed of the tool.

4. The robot control system according to claim 1, wherein the control-signal-generating unit is configured to determine a control value for an advancing speed of the tool such that a force in an advancing direction of the tool becomes constant or falls within a predetermined range, and to generate a control signal for the arm regarding the profile copying such that the advancing speed of the tool becomes the determined control value for the advancing speed of the tool.

5. The robot control system according to claim 1, wherein the control-signal-generating unit is configured to determine a control value for a position in a tool radial direction perpendicular to an advancing direction of the tool such that a force in the tool radial direction becomes constant or falls within a predetermined range, and to generate a control signal for the arm regarding the profile copying such that the position in the tool radial direction perpendicular to the advancing direction of the tool becomes the determined control value for the position in the tool radial direction.

6. The robot control system according to claim 1 for a robot comprising an arm capable of moving the tool in three-dimensional directions, the arm being equipped with a rotating mechanism, wherein
 the load-acquiring unit is configured to acquire at least a measurement of a force applied from the tool and the copying mold placed on the machining object to the arm during profile copying performed on a machining object by using the tool and by moving the arm while the copying guide and the copying mold are kept in contact with each other,
 the copying guide is a guide for positioning the tool in a tool radial direction perpendicular to an advancing direction of the tool by coming into contact with the copying mold in the tool radial direction, and is a guide for positioning the tool in the direction of the tool axis by coming into contact with the copying mold in the direction of the tool axis, and
 the control-signal-generating unit is configured to:
 determine a control value for an advancing speed of the tool such that a force in an advancing direction of the tool becomes constant or falls within a predetermined range, and to generate a control signal for the arm regarding the profile copying such that the advancing speed of the tool becomes the determined control value for the advancing speed of the tool;
 determine a control value for a position in a tool radial direction perpendicular to an advancing direction of the tool such that a force in the tool radial direction becomes constant or falls within a predetermined range, and to generate a control signal for the arm regarding the profile copying such that the position in the tool radial direction perpendicular to the advancing direction of the tool becomes the determined control value for the position in the tool radial direction; and
 determine a control value for a position of the tool in a direction of a tool axis such that a force of the tool in the direction of the tool axis becomes constant or falls within a predetermined range, and to generate a control signal for the arm regarding the profile copying such that the position of the tool in the direction of the tool axis becomes the determined control value for the position of the tool in the direction of the tool axis.

7. The robot control system according to claim 1, wherein the control-signal-generating unit is configured to abort the profile copying by stopping a movement of the arm if the force acquired by the load-acquiring unit is greater than or equal to a threshold or exceeds the threshold.

8. The robot control system according to claim 1, further comprising a warning-information-generating unit configured to output warning information to a display device if the force acquired by the load-acquiring unit is greater than or equal to a threshold or exceeds the threshold.

9. The robot control system according to claim 1, further comprising a forwarding mechanism that is supported by the arm and moves the tool forward in a direction of a tool axis,
 wherein, in a case of drilling of the machining object with the tool, the control-signal-generating unit is configured to determine a control value for a forwarding speed of the forwarding mechanism such that a force of the tool in a direction of a tool axis becomes constant or falls within a predetermined range, to generate a control signal for the forwarding mechanism regarding the drilling such that the forwarding speed becomes the determined control value for the forwarding speed, and to output the control signal to the forwarding mechanism.

10. A machining robot comprising:
the robot control system according to claim 1;
the arm; and
the force sensor.

11. A robot control method for a robot comprising an arm, the arm being capable of holding a tool while rotating the tool and capable of moving the tool in at least two-dimensional directions, the arm being equipped with a rotating mechanism provided for the tool, the robot control method comprising:
a step of acquiring a force measured by a force sensor supported by the arm and configured to measure at least a force applied from the tool to the arm during profile copying performed on a machining object by using the tool and by moving the arm; and
a step of automatically controlling the arm such that the profile copying is performed, by generating a control signal for the arm regarding the profile copying in accordance with the acquired force and with control information for the arm regarding the profile copying, and by outputting the generated control signal to the arm.

12. A non-transitory computer readable medium containing a robot control program for a robot comprising an arm, the arm being capable of holding a tool while rotating the tool and capable of moving the tool in at least two-dimensional directions, the arm being equipped with a rotating mechanism provided for the tool,
the robot control program causing, when executed by the robot control system according to claim 1, the robot control system to implement a method, the method comprising:
acquiring a force measured by a force sensor configured to measure at least a force applied from the tool to the arm during profile copying performed on a machining object by using the tool and by moving the arm; and
automatically controlling the arm such that the profile copying is performed, by generating a control signal for the arm regarding the profile copying in accordance with the acquired force and with control information for the arm regarding the profile copying, and by outputting the generated control signal to the arm.

13. A machining method comprising:
manufacturing a finished or half-finished product through profile copying performed on a machining object by using a tool, in which the tool, a rotating mechanism configured to rotate the tool, and a copying guide to be brought into contact with a copying mold to be placed on the machining object are attached to an arm comprised in a robot and being movable in at least two-dimensional directions, and the arm is moved while the copying guide and the copying mold are kept in contact with each other;
measuring, with a force sensor supported by the arm, at least a force applied from the tool to the arm during the profile copying; and
automatically adjusting a traveling speed of the arm in accordance with the force measured with the force sensor.

14. The machining method according to claim 13, wherein a finished or half-finished product made of a composite material is manufactured through profile trimming performed on a machining object made of carbon-fiber-reinforced plastic, the profile trimming being performed by using a diamond tool or a cemented carbide tool as the tool.

15. The machining method according to claim 14, wherein if the diamond tool is used as the tool, the traveling speed of the arm is automatically adjusted such that a reaction force applied to the diamond tool becomes 3 kgf or greater and 10 kgf or smaller; and if the cemented carbide tool is used as the tool, the traveling speed of the arm is automatically adjusted such that a reaction force applied to the cemented carbide tool becomes 3 kgf or greater and 5 kgf or smaller.

16. The robot control system according to claim 1, wherein the copying guide is rigidly fixed to the arm.

17. The robot control system according to claim 1, wherein the copying guide is configured to abut movement in both a direction parallel to an axis of tool extension from the arm and in a direction perpendicular to the axis of tool extension from the arm.

18. The robot control system according to claim 1, wherein the copying guide is rotationally fixed to the arm as to have a rotation axis in common with a tool rotation axis.

19. The robot control system according to claim 1, wherein the arm has a plurality of pivot joints that are spaced along the arm length and between proximal and distal ends of the arm as to enable movement of the copying guide in three-dimensional directions, as well as movement of the tool in a direction in common with a tool rotation axis.

* * * * *